United States Patent
Grimley-Evans

(10) Patent No.: US 11,099,868 B2
(45) Date of Patent: Aug. 24, 2021

(54) SYSTEM AND METHOD FOR TRANSLATING A GUEST INSTRUCTION OF A GUEST ARCHITECTURE INTO AT LEAST ONE HOST INSTRUCTION OF A HOST ARCHITECTURE

(71) Applicant: ARM LIMITED, Cambridge (GB)

(72) Inventor: Edmund Thomas Grimley-Evans, Cambridge (GB)

(73) Assignee: ARM LIMITED, Cambridge (GB)

( * ) Notice: Subject to any disclaimer, the term of this patent is extended or adjusted under 35 U.S.C. 154(b) by 0 days.

(21) Appl. No.: 15/565,489

(22) PCT Filed: Mar. 4, 2016

(86) PCT No.: PCT/GB2016/050567
§ 371 (c)(1),
(2) Date: Oct. 10, 2017

(87) PCT Pub. No.: WO2016/177990
PCT Pub. Date: Nov. 10, 2016

(65) Prior Publication Data
US 2018/0173546 A1    Jun. 21, 2018

(30) Foreign Application Priority Data

May 1, 2015    (GB) ..................................... 1507536

(51) Int. Cl.
*G06F 9/455*    (2018.01)
*G06F 9/30*    (2018.01)
(Continued)

(52) U.S. Cl.
CPC ............ *G06F 9/4552* (2013.01); *G06F 8/443* (2013.01); *G06F 8/4441* (2013.01); *G06F 8/52* (2013.01);
(Continued)

(58) Field of Classification Search
CPC .......................... G06F 9/4552; G06F 9/30174
See application file for complete search history.

(56) References Cited

U.S. PATENT DOCUMENTS 7,363,471 B2 *    4/2008    Berkowits ............. G06F 9/3861
                                                     712/221
8,074,055 B1    12/2011    Yates, Jr. et al.
(Continued)

FOREIGN PATENT DOCUMENTS

EP    1 447 742    8/2004

OTHER PUBLICATIONS

International Search Report for PCT/GB2016/050567, dated Jun. 20, 2016, 2 pages.
(Continued)

*Primary Examiner* — William B Partridge
(74) *Attorney, Agent, or Firm* — Nixon & Vanderhye, P.C.

(57) ABSTRACT

A system and method are provided for translating a guest instruction of a guest architecture into at least one host instruction of a host architecture. The method comprises providing multiple representation states, each representation state providing a representation in the host architecture for at least one item of state from the guest architecture. A current representation state is then determined from amongst the multiple representation states, and the guest instruction is translated into at least one host instruction in dependence on the current representation state. Through the use of multiple representation states, it has been found that the efficiency of the code translation can be significantly increased, thereby giving rise to performance and energy consumption benefits.

27 Claims, 12 Drawing Sheets

(51) Int. Cl.
*G06F 8/41* (2018.01)
*G06F 8/52* (2018.01)

(52) U.S. Cl.
CPC ...... *G06F 9/30098* (2013.01); *G06F 9/30174* (2013.01)

(56) References Cited

U.S. PATENT DOCUMENTS

| | | |
|---|---|---|
| 2001/0044891 A1 | 11/2001 | McGrath et al. |
| 2009/0094586 A1 | 4/2009 | Brown et al. |
| 2014/0189661 A1 | 7/2014 | Wuerthinger et al. |
| 2014/0304493 A1 | 10/2014 | Zhong et al. |
| 2015/0178104 A1* | 6/2015 | Venkatasubramanian .................. G06F 9/44589 717/126 |

OTHER PUBLICATIONS

Written Opinion of the ISA for PCT/GB2016/050567, dated Jun. 20, 2016, 11 pages.
GB Search Report for GB1507536.9, dated Oct. 29, 2015, 5 pages.
Office Action in corresponding Chinese Application No. 201680023881.6 dated Feb. 24, 2021 (includes English translation).

* cited by examiner

REGISTER IN AArch 32

140 — R (32-BIT REGISTER)

REGISTER IN AArch 64

150 — X (64 BIT REGISTER), W (32 BITS), 155

FIG. 4A

| AArch 32 INSTRUCTION | TRANSLATION | AArch 64 INSTRUCTIONS |
|---|---|---|
| ADD   R1, R2, R3 | → | ADD   W1, W2, W3 |
| ADDS   R1, R2, R3  SETS ALL FLAGS | → | ADDS   W1, W2, W3  SETS ALL FLAGS |
| ANDS   R1, R2, R3  ONLY SETS N & Z LEAVING C AND V UNCHANGED | ✗ | ANDS   W1, W2, W3  SETS N AND Z, WHILE CLEARING C AND V |

FIG. 4B

PRESENT TECHNIQUE

REP STATE 0    AArch32 NZCV REPRESENTED IN AArch64 NZCV

REP STATE 1    AArch32 N AND Z REPRESENTED IN AArch64 NZCV
               AArch32 C AND V REPRESENTED IN BITS 29 AND 28 OF W20

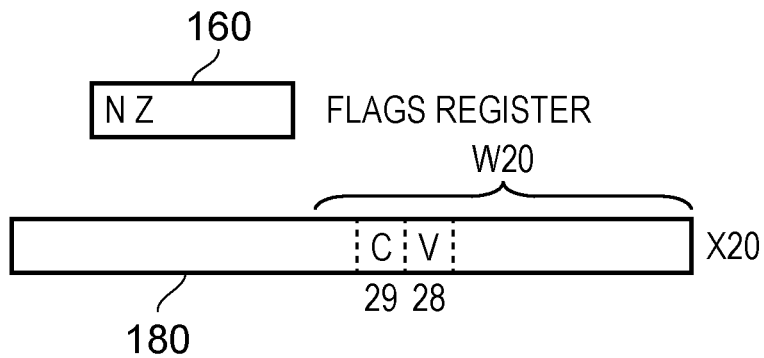

FIG. 5A

| AArch 32 INSTRUCTION | TRANSLATION | AArch 64 INSTRUCTION |
|---|---|---|
| ADD   R1, R2, R3 | → | ADD   W1, W2, W3 (WHATEVER REP STATE-MAKES NO USE OF FLAGS) |
| ADDS  R1, R2, R3 | → | ADDS  W1, W2, W3 (WHATEVER THE REP STATE AND THEN END IN REP STATE 0) |
| ANDS  R1, R2, R3 | → | ANDS  W1, W2, W3 (IF IN REP STATE 1, AND THEN STAY IN REP STATE 1) |
| | → | MRS  X20, NZCV ANDS  W1, W2, W3 (IF IN REP STATE 0, AND THEN MOVE TO REP STATE 1) |

FIG. 5B

ENDIANNESS

AArch 32          LOAD + STORE INSTRUCTIONS OPERATE DIFFERENTLY DEPENDENT ON STATE OF PROCESSOR AArch 64          ENDIANNESS FIXED (TYPICALLY LITTLE ENDIAN)

REP STATE Y MEANS GUEST LITTLE ENDIAN

REP STATE Z MEANS GUEST BIG ENDIAN

IF IN REP STATE Y, CAN HAVE SIMPLE TRANSLATION

IF IN REP STATE Z, NEED MORE COMPLEX TRANSLATION (E.G. TO LOAD/STORE AND THEN SWAP BYTES ORDERING).

IN REP STATE Y

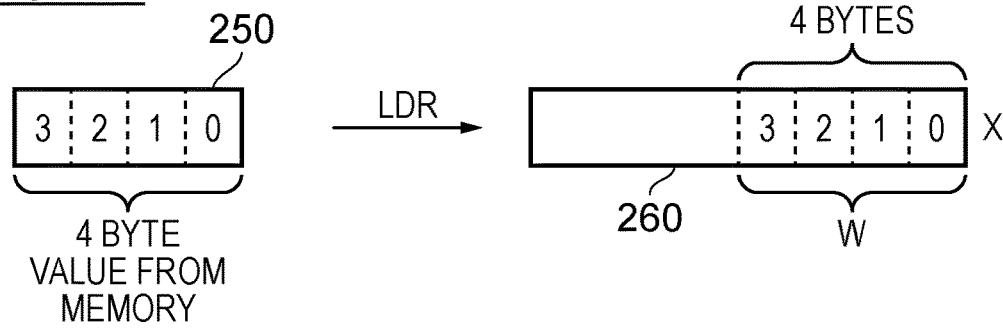

IN REP STATE Z

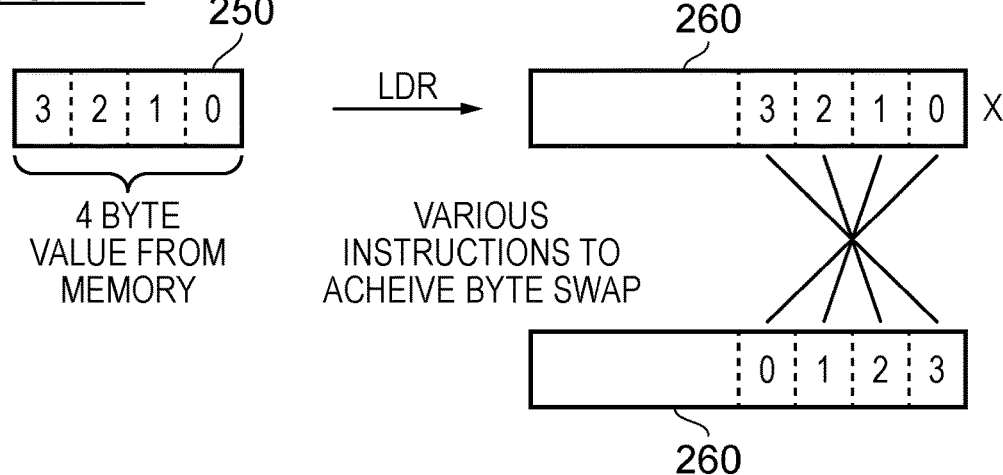

FIG. 7

SYSTEM AND METHOD FOR TRANSLATING A GUEST INSTRUCTION OF A GUEST ARCHITECTURE INTO AT LEAST ONE HOST INSTRUCTION OF A HOST ARCHITECTURE

This application is the U.S. national phase of International Application No. PCT/GB2016/050567 filed 4 Mar. 2016, which designated the U.S. and claims priority to GB Patent Application No. 1507536.9 filed 1 May 2015, the entire contents of each of which are hereby incorporated by reference.

The present technique relates to a system and method for translating a guest instruction of a guest architecture into at least one host instruction of a host architecture.

It is known to provide a host data processing system having a host architecture, and arranged to execute a sequence of instructions in order to perform data processing operations. Typically, a host instruction set architecture will be defined, and programs constructed using instructions of the host instruction set architecture can then be executed directly on the host system.

However, it is also useful to provide the ability for code written using guest instructions associated with a guest architecture to be executed on the host data processing system. In particular, it is known to provide code translation techniques (typically referred to as binary translation techniques) for translating instructions of the guest architecture into instructions of the host architecture, so that when the resultant sequence of host instructions are executed on the host architecture, they will implement the functionality required by the original guest instructions.

A number of issues can arise that can adversely impact the efficiency of such code translation, for example resulting in a significant increase in the number of host instructions required to implement the functionality of the original guest instructions. For example, it can be the case that certain state associated with the guest architecture differs from the state of the host architecture, and/or that certain instructions in the guest architecture update state in a different way to equivalent instructions in the host architecture. To ensure that state data is used correctly, and/or that state data is updated as required, it can be necessary to construct quite complex sequences of host instructions in order to represent certain guest instructions.

Accordingly, it would be desirable to provide a more efficient mechanism for translating an instruction of a guest architecture into at least one host instruction of a host architecture.

In accordance with one example configuration, there is provided a computer-implemented method of translating a guest instruction of a guest architecture into at least one host instruction of a host architecture, comprising: providing multiple representation states, each representation state providing a representation in the host architecture of at least one item of state from the guest architecture; determining a current representation state, the current representation state being one of the multiple representation states; and translating the guest instruction into said at least one host instruction in dependence on the current representation state.

In accordance with a further example configuration, there is provided a non-transitory computer program product comprising a computer program which, when executed on a computer, performs the computer-implemented method of translating a guest instruction of a guest architecture into at least one host instruction of a host architecture in accordance with the above described example configuration.

In a yet further example configuration, there is provided a system for translating a guest instruction of a guest architecture into at least one host instruction of a host architecture, comprising: storage to identify a current representation state from multiple representation states, each representation state providing a representation in the host architecture of at least one item of state from the guest architecture; and translation circuitry to translate the guest instruction into said at least one host instruction in dependence on the current representation state.

In a still further example configuration, there is provided a data processing apparatus for executing a guest program comprising guest instructions of a guest architecture, the data processing apparatus having a host architecture and comprising a system in accordance with the above example configuration for translating guest instructions of the guest architecture into host instructions of the host architecture.

In a still further example configuration, there is provided a system for translating a guest instruction of a guest architecture into at least one host instruction of a host architecture, comprising: means for identifying a current representation state from multiple representation states, each representation state providing a representation in the host architecture of at least one item of state from the guest architecture; and means for translating the guest instruction into said at least one host instruction in dependence on the current representation state.

The present technique will be described further, by way of example only, with reference to embodiments thereof as illustrated in the accompanying drawings, in which:

FIG. 1A is a block diagram of a host data processing system in which the techniques of the described embodiments can be employed;

FIG. 1B schematically illustrates the translation of a guest program for execution on the host architecture of the host system of FIG. 1A in accordance with one embodiment;

Figure 3:
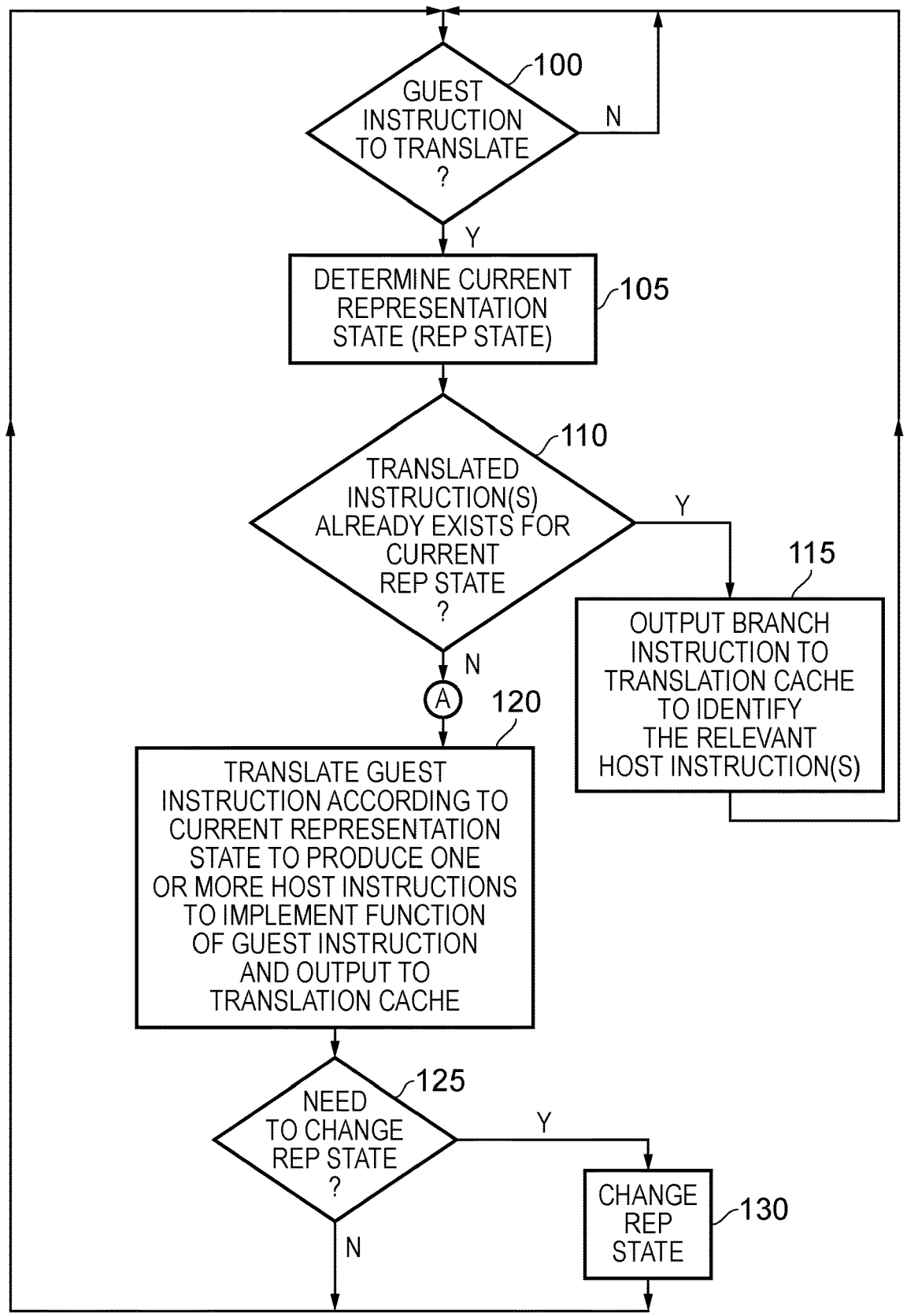
FIG. 3 is a flow diagram illustrating in more detail the operation of the binary translator in accordance with one embodiment.
Figure 4C:
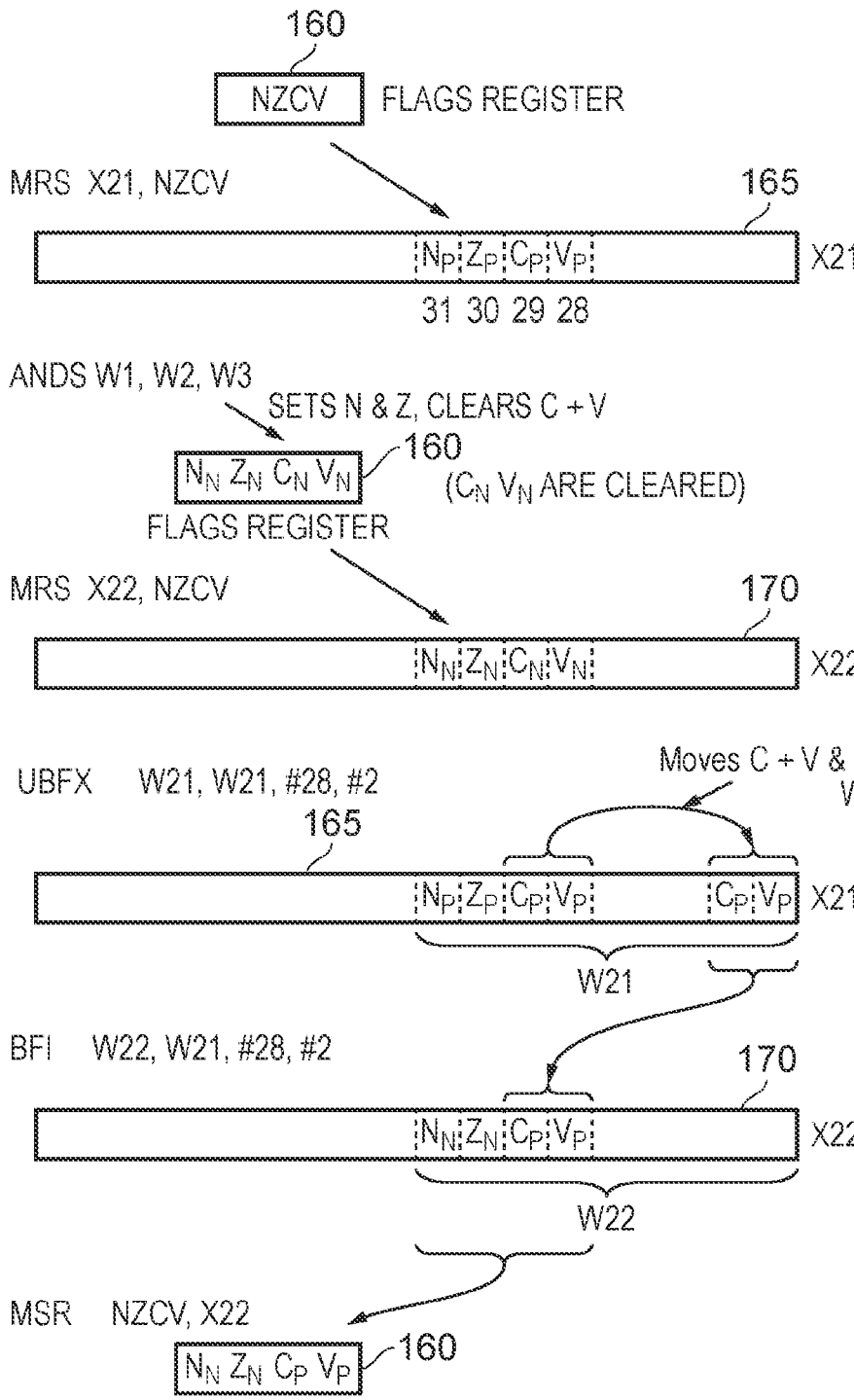
FIG. 4A illustrates the register terminology used for an example guest architecture and host architecture in accordance with one embodiment.
Figure 6:
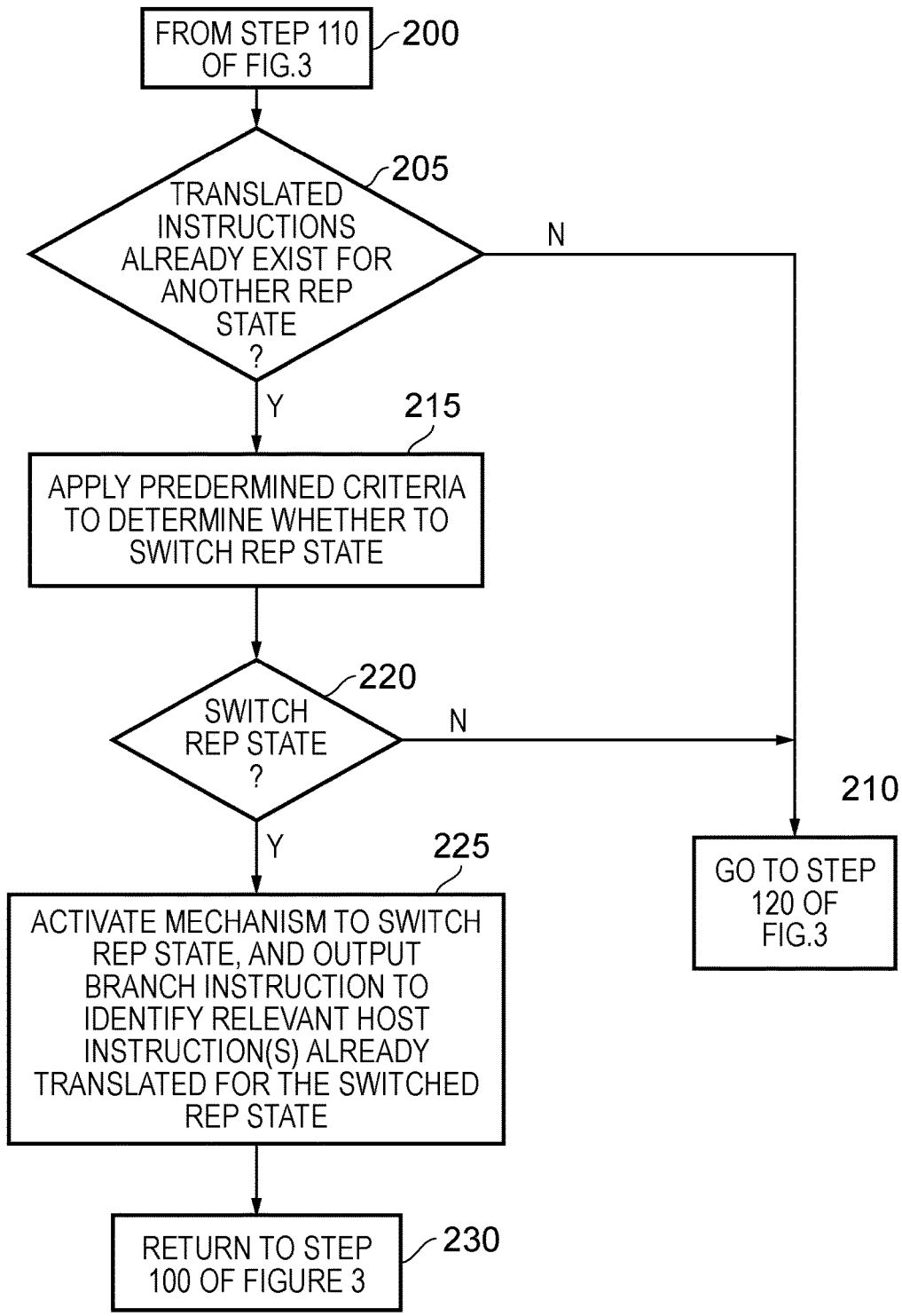
Figure 8:
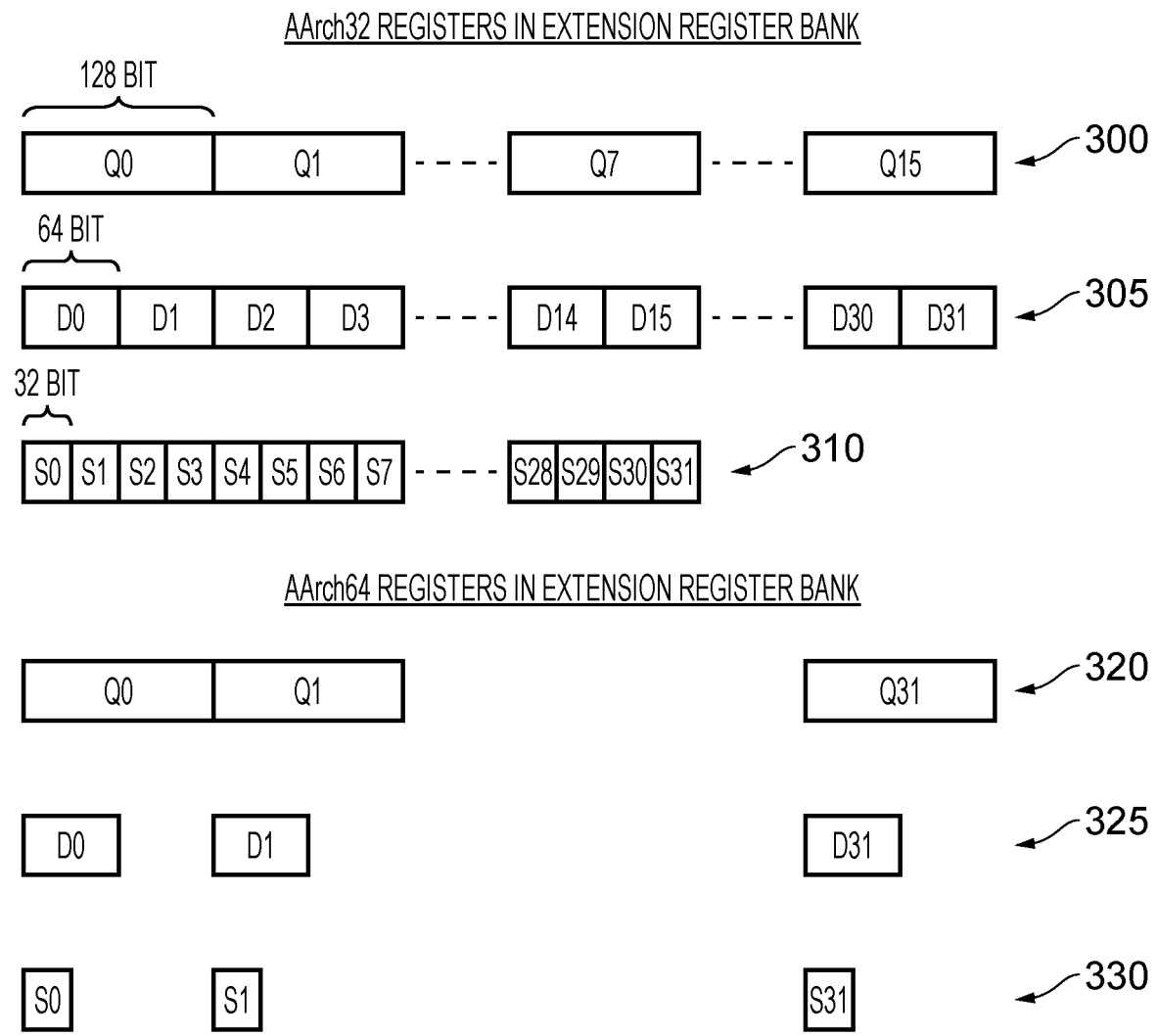
Figure 9:
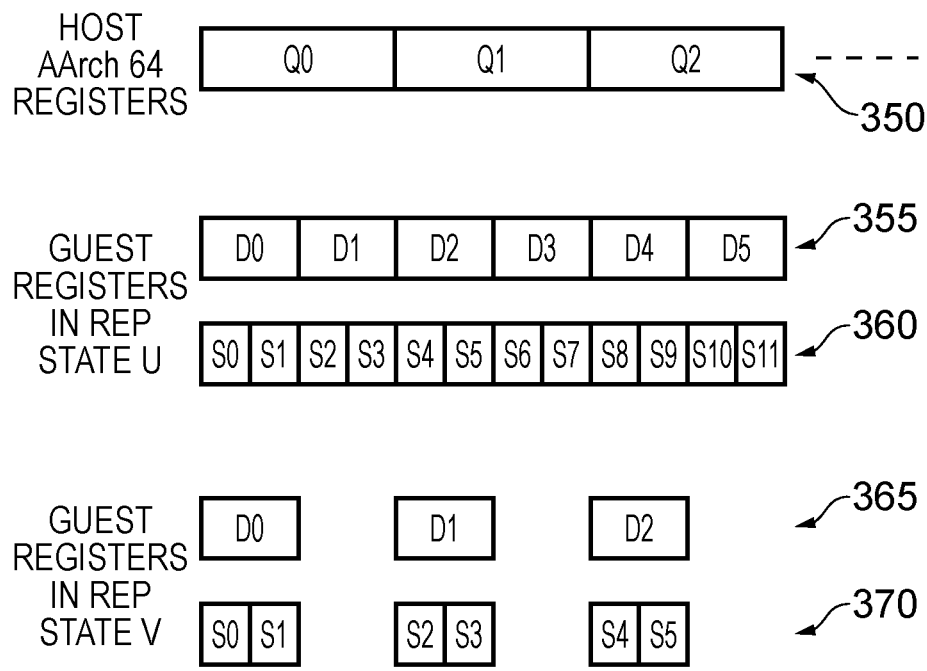
Figure 10:
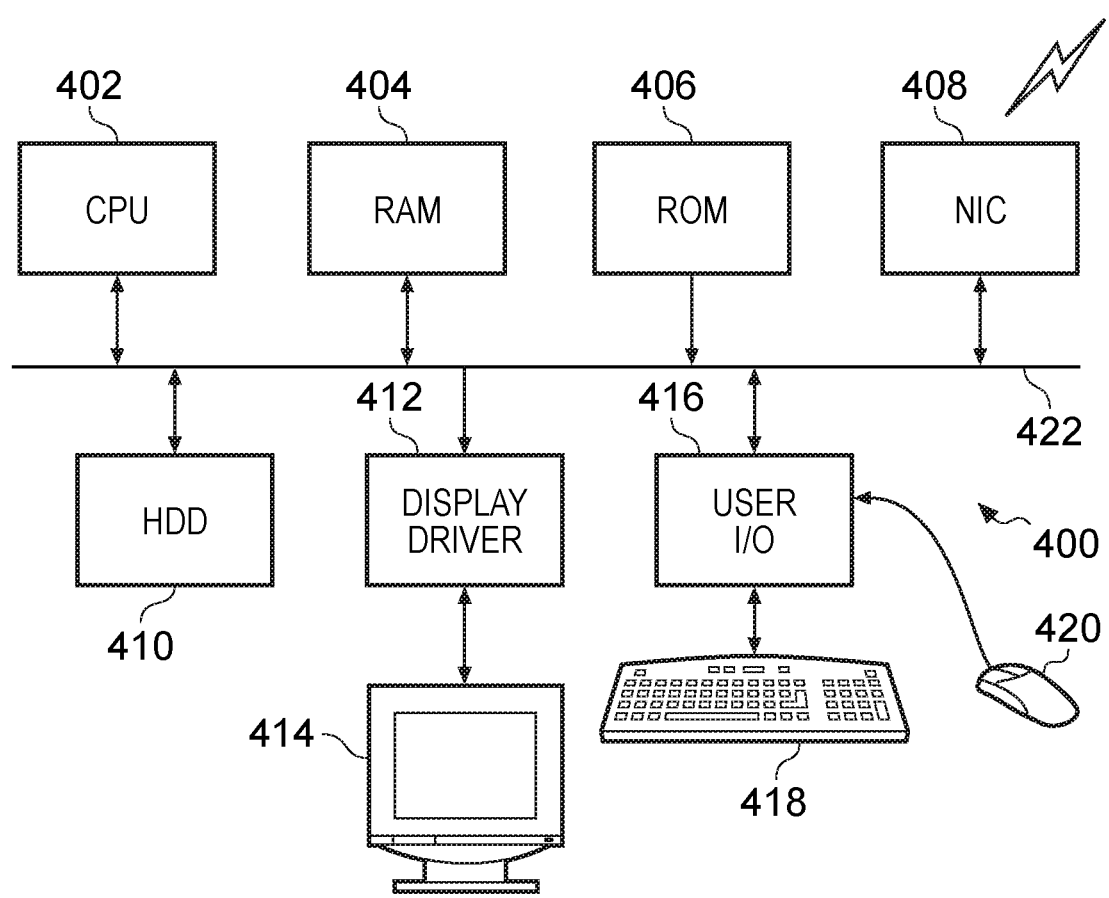

FIG. 4B schematically illustrates the translation of certain guest instructions into equivalent host instructions in accordance with one embodiment;

FIG. 4C provides a representative illustration of how an ANDS instruction of the guest architecture might be translated into equivalent host instructions if the approach of the described embodiments is not used;

FIG. 5A illustrates two representation states that may be provided in accordance with one embodiment to represent condition code flags;

FIG. 5B illustrates how the two representation states of FIG. 5A can be used to simplify the translation of certain guest instructions into equivalent host instructions in accordance with one embodiment;

FIG. 6 is a flow diagram illustrating some optional additional steps that may be incorporated within the earlier described binary translation approach of FIG. 3 in accordance with one embodiment;

FIG. 7 illustrates two representation states that can be used to represent the endianness of the guest architecture in order to assist in binary translation of instructions from the guest architecture to the host architecture in accordance with one embodiment;

FIG. 8 illustrates differences that may exist between how registers in the extension register bank are used in the guest architecture, and how they are used in the host architecture, in accordance with one embodiment;

FIG. 9 illustrates the use of two representation states to provide different mappings of the vector registers within the extension register bank of the host architecture in accordance with one embodiment, and how those representation states can be used to improve the efficiency of translation; and FIG. 10 schematically illustrates a general purpose computer of the type which can be used to implement the present techniques.

Before discussing the embodiments with reference to the accompanying figures, the following description of embodiments is provided.

In one embodiment, a computer-implemented method of translating a guest instruction of a guest architecture into at least one host instruction of a host architecture is provided. The method comprises providing multiple representation states, where each representation state provides a representation in the host architecture of at least one item of state from the guest architecture. A current representation state from amongst the multiple representation states is then determined, and the guest instruction is translated into at least one host instruction in dependence on the current representation state.

By providing multiple representation states that can be used in the host architecture to represent one or more items of state from the guest architecture, it has been found that this enables some significant efficiency improvements in the translation process, for example by enabling a significantly reduced number of host instructions to be used to represent a sequence of guest instructions.

There are a number of ways in which the representation state may be changed during performance of the above described method. In one embodiment, a code translation element used to translate the guest instruction selectively changes the current representation state during translation of the guest instruction. Hence, in such embodiments, there is an option for the translation mechanism itself to bring about a change in the current representation state, with the aim of improving the translation efficiency. In other embodiments, dependent on the one or more items of state from the guest architecture being represented by the representation states, the translation mechanism itself may merely utilise the current representation state, and other elements in the system may alter the representation state, for example to reflect changes in the corresponding item(s) of state in the guest architecture.

In one example embodiment where the translation mechanism may itself change the current representation state, the method may further comprise selecting a translation mechanism from a first translation mechanism and a second translation mechanism dependent on which of the first and second translation mechanisms will produce a more efficient translation, the first translation mechanism translating the guest instruction whilst maintaining the current representation state and the second translation mechanism translating the guest instruction whilst changing the current representation state. The translation of the guest instruction then employs the selected translation mechanism. Depending on embodiment, and the item(s) of state being represented by the representation states, the second translation mechanism may change the current representation state prior to translating the guest instruction, or may change the current representation state after the translation has been performed.

There are a number of ways in which the selected translation mechanism can be chosen, but in one embodiment the selected translation mechanism is the one of the first and second translation mechanism that produces the least number of host instructions to implement the function of the guest instruction. Hence, the translation mechanism is chosen so as to improve code density in the resultant sequence of host instructions, and hence result in a more efficient translation for implementing the functionality required by the associated guest instruction(s).

In one embodiment, the method further comprises storing the generated at least one host instruction in a translation storage for subsequent execution. This translation storage can then be referred to later in order to remove the need for certain subsequent guest instructions to be retranslated.

In particular, in one embodiment, the method further comprises determining when a translation of the guest instruction for the current representation state already exists in the translation storage, and upon such determination outputting a reference to the existing translation instead of translating the guest instruction.

Whilst in one embodiment the method may be arranged to translate the guest instruction if a translation for that guest instruction does not already exist in the translation storage for the current representation state, in an alternative embodiment it may still be possible to avoid translation of the guest instruction even if a translation does not already exist in the translation storage for the current representation state.

In particular, in one embodiment, the method further comprises determining when a translation of the guest instruction already exists in the translation storage for a different representation state that is not the current representation state. Upon such determination, predetermined criteria are applied to determine whether to change the current representation state to said different representation state. When it is determined to change the current representation state, then a predetermined mechanism is activated to implement the change of the current representation state to said different representation state, and in addition a reference to the existing translation is output for storage in the translation storage instead of translating the guest instruction.

The predetermined mechanism activated to implement the change in representation state can take a variety of forms. For example, in some embodiments it may be sufficient, at least for certain representation state changes, for the translation mechanism merely to note that the representation state has been changed. However, in an alternative embodiment the predetermined mechanism may involve issuing one or more instructions for storage in the translation storage, with execution of those instructions then resulting in a change of the current representation state.

The predetermined criteria will vary dependent on embodiment, and hence for example on the actual items of state being represented by the different representation states. Effectively, a balance may need to be made between the efficiencies gained by using the already existing translation, and any costs associated with changing the representation state.

There are a number of ways in which a reference to the existing translation can be output, but in one embodiment such a reference comprises adding a branch instruction to the translation storage, to cause a branch to the existing code translation to take place at the appropriate point during execution of the code.

The multiple representation states can take a variety of forms, but in one embodiment comprise at least two representation states that provide different representations in the host architecture of said at least one item of state from the guest architecture. Hence, in such embodiments, the at least two representation states provide different ways of representing certain guest architecture state within the host architecture.

Such items of guest architecture state take a variety of forms, but in one embodiment comprises a plurality of condition flag values.

More particularly, in one embodiment, in a first representation state the plurality of condition code flags are stored in a condition flags register provided in the host architecture, and in a second representation state a first subset of the plurality of condition code flags are stored in the condition flags register provided in the host architecture and a second subset of the condition code flags are stored in a further register.

Hence, in the first representation state the condition code flags are stored in a condition flags register provided in the host architecture, which may for example be of a similar form to a condition flags register provided in the guest architecture, this hence providing an intuitive representation. However, the inventor realised that in certain situations, due to differences in the way in which the condition code flags are updated between certain instructions in the guest architecture and certain instructions in the host architecture, this can give rise to significant complexity in the translation of those guest instructions. However, the inventor realised that by providing a second representation where only a subset of the plurality of condition code flags are stored in a condition flags register provided in the host architecture, and then a second subset of the condition code flags are stored in a further register, it was possible to significantly reduce the number of host instructions required to represent the guest instruction, whilst still ensuring that the condition code flags were updated in the manner intended by the guest instruction.

In particular, in one embodiment, when the guest instruction is a predetermined guest instruction, a code translation element used to translate the guest instruction changes the current representation state from said first representation state to said second representation state during translation of the guest instruction. By changing the representation state, it is then possible to produce a translation with a significantly improved code density.

The multiple representation states can take a variety of different forms, dependent on embodiment. In one embodiment, the multiple representation states comprise a first endian representation state set when the guest architecture is using a first endian data format, and a second endian representation state set when the guest architecture is using a second endian data format, the translation of the guest instruction being dependent on which of the first and second endian representation states is the current representation state.

By such an approach, the translation circuitry can take account of the endianness currently utilised in the guest architecture, along with knowledge of the endianness of the host architecture, in order to in some instances significantly simplify the translation required.

In one such arrangement, when guest instructions are encountered that change the endianness of the guest architecture, this will also cause a change in the current representation state that will then be used for subsequent code translation.

In a yet further embodiment, the multiple representation states may comprise at least a first control storage representation state indicating that first state from the guest architecture is represented within a predetermined control storage of the host architecture, and a second control storage representation state indicating that second state from the guest architecture is represented within said predetermined control storage of the host architecture.

Hence, in such an embodiment, at least two of the multiple representation states identify different state from the guest architecture that should be stored within a predetermined control storage of the host architecture. It has been found that in certain situations, this can significantly improve the code density achievable when translating certain guest instructions.

For example, in one embodiment, the first state is state data associated with a first type of guest instruction, and the second state data is state data associated with a second type of guest instruction.

In one particular embodiment, the first state data is state data associated with an equivalent control storage of the guest architecture to the predetermined control storage of the host architecture, and the second state data is a set of replacement state values used by the second type of guest instruction instead of the state data associated with the equivalent control storage of the guest architecture.

Such an approach is useful in a variety of situations. For example, it may be the case that some guest instructions use the contents of the equivalent control storage of the guest architecture, whilst other guest instructions ignore the values of that equivalent control storage and instead use replacement state values. However, in the host architecture, it may be the case that all instructions use the values stored in the predetermined control storage of the host architecture. The above mechanism allows the above facts to be taken into account, whilst achieving good code density in the translation.

In a yet further embodiment, the multiple representation states comprise a first status field representation state indicating that one or more status values have been set by the guest architecture, and a second status field representation state indicating that setting of said one or more status values by the guest architecture is one of not known and not set, the translation of the guest instruction being dependent on which of the first and second status field representation states is the current representation state.

When it is not known that the one or more status values have been set by the guest architecture, or it is known that they have not been set, then it may be necessary for a reasonably complex sequence of host instructions to be used to represent certain guest instructions. However, if it is known that those one or more status values have been set by the guest architecture, this can in certain situations lead to a significant reduction in the complexity of the code translation, thereby significantly improving code density. As a particular example, such reductions can be achieved for certain instructions if it is known that particular sticky values in the guest architecture have been set. In one particular embodiment, the one or more status values comprises at least one of an invalid sticky value and an inexact sticky value.

In a yet further example embodiment, the multiple representation states may comprise a first register tracking representation state indicating that no register tracking is being performed, and a second register tracking representation state identifying a register location in the host architecture storing a data value derived from at least one item of state from the guest architecture.

In particular, in some embodiments, if information can be determined about a particular item of state from the guest architecture, by tracking contents of certain registers in the host architecture, then knowledge about the value of such items of state can be used to significantly reduce the complexity of the translation required. In one particular example, the at least one item of state from the guest architecture is a program counter value from the guest architecture. In particular, certain guest instructions will perform manipulations using the guest program counter value, or a value derived therefrom. Typically, the host architecture will not have knowledge of the guest program counter value. However, in some instances, that knowledge can be derived from the contents of data stored in particular registers in the host architecture due to the processing of previous instructions, and in one embodiment this knowledge can be taken advantage of in order to reduce the complexity of certain subsequent code translations.

As another example of representation states that may provide different representations in the host architecture of at least one item of state from the guest architecture, in a yet further embodiment the at least two representation states may comprise a first register mapping representation state providing a first mapping between registers of the guest architecture and registers of the host architecture, and a second register mapping representation state providing a second mapping between registers of the guest architecture and registers of the host architecture. In particular, it has been found that by providing the flexibility to map differently between the registers of the guest architecture and the host architecture dependent on the representation state, it is possible to significantly reduce the complexity of certain code translations.

In one embodiment, a code translation element used to translate the guest instruction applies predetermined criteria in order to determine whether to change the current representation state prior to translation of the guest instruction. The predetermined criteria can take a variety of forms. However, by way of example, there will typically be a cost associated with changing the register mapping, for example due to the need to move the existing contents of certain registers in order to reflect any change in the mapping, and accordingly the predetermined criteria may seek to assess whether that cost would be appropriate, in light of the instructions awaiting translation. In such an embodiment, it may be that the code translation element would look not only at a current guest instruction that needs translation, but also at a number of future code sections that need translating, in order to determine whether a change in the representation state was appropriate.

The above described translation methodology may be used in a variety of different scenarios. For example, it could be used in a static binary translation system with the aim of converting all of the code of an executable file into code that will run on the host architecture, without having to run that code first. However, in an alternative embodiment, the described method performs dynamic binary translation of a sequence of guest instructions. Dynamic binary translation involves the execution of a program by translating its instructions as required during execution. Typically, dynamic binary translation looks at a short sequence of code, for example of the order of a single basic block, and then translates it and caches the resulting sequence. Code is then translated as and when needed, and mechanisms such as branch instructions are used to reutilise already translated and saved code.

The guest architecture and the host architecture may take a variety of forms, and indeed the above described embodiments may be applied to a wide variety of guest and host architecture combinations. In particular, there is no need for the guest architecture and host architecture to be architectures developed by the same company, and hence guest instructions of a guest instruction set developed by a first company may be translated into host instructions of a host instruction set developed by another company if desired. Alternatively, both the guest instruction set and the host instruction set may be instruction sets developed by the same company. Similarly, there is no restrictions on the data widths manipulated by the host architecture and the guest architecture. However, in one embodiment the host architecture uses a different data width from a data width used by the guest architecture. In one particular example, instructions of a 32 bit architecture may be translated into instructions of a 64 bit architecture, or vice versa, whilst in other embodiments both the guest architecture and the host architecture may operate on the same data widths.

In one embodiment, a computer program may be provided which, when executed on a computer, performs the above described computer implemented method for translating a guest instruction of a guest architecture into at least one host instruction of a host architecture.

In a yet further embodiment, a system is provided for translating a guest instruction of a guest architecture into a least one host instruction of a host architecture, the system having storage to identify a current representation state, and translation circuitry for translating the guest instruction into at least one host instruction in dependence on the current representation state.

Such a system may be incorporated within a data processing apparatus used to execute a guest program comprising guest instructions of a guest architecture, where the data processing apparatus has a host architecture, and the above described system translates the guest instructions of the guest architecture into host instructions of the host architecture. Such a data processing apparatus, incorporating the translation techniques of the above described embodiments, can be arranged to operate at higher performance, and/or more energy efficiently, due to the improvements in code density that can result from the application of the code translation techniques described above.

Particular embodiments will now be described with reference to the figures.

Figure 1A:
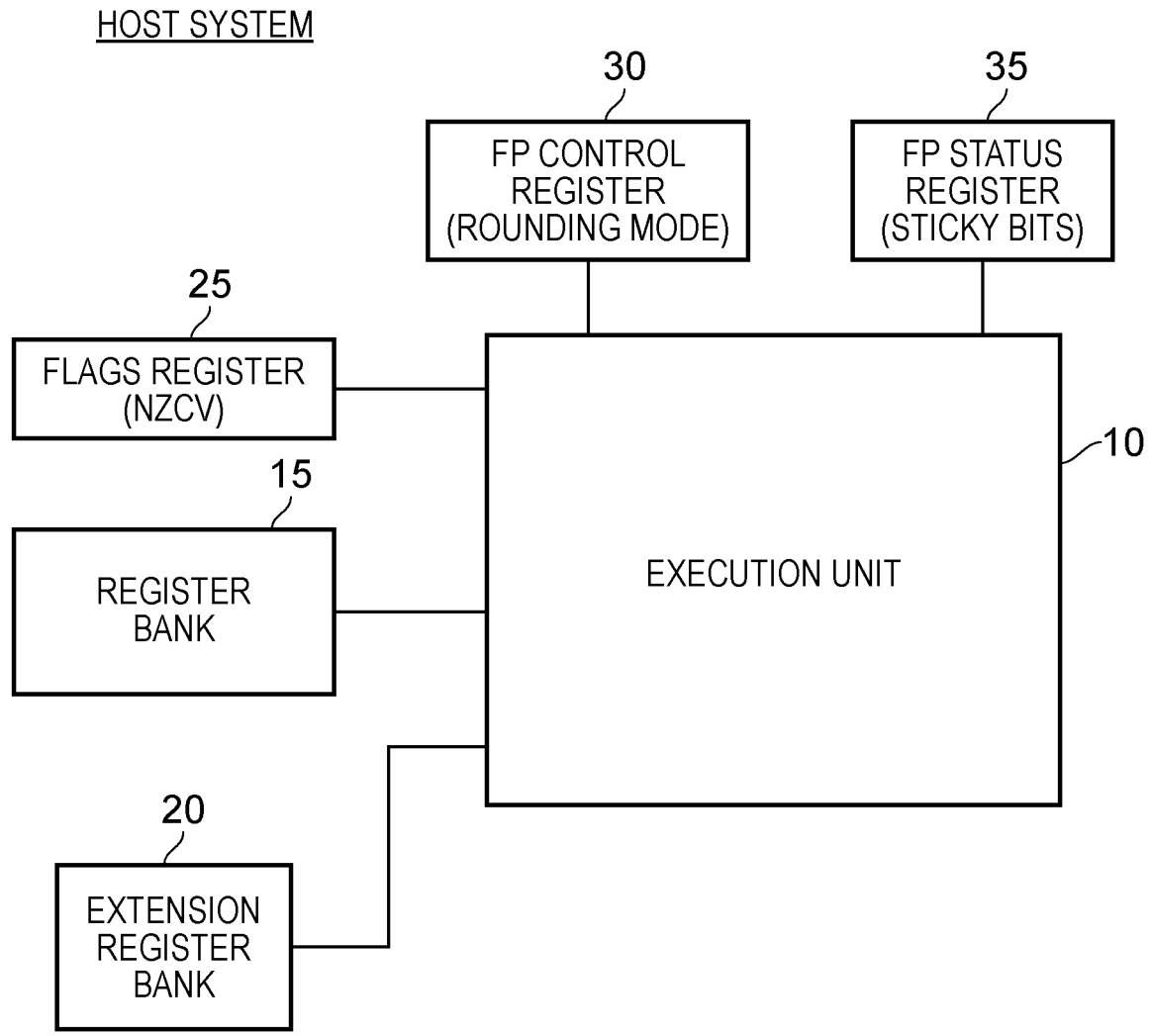

FIG. 1A is a block diagram of a host data processing system in which the techniques of the described embodiments may be employed. An execution unit 10 is provided for executing a sequence of instructions in order to perform data processing operations. As will be well understood, the execution unit 10 will have access to a variety of resources when executing the instructions, including a register bank 15 containing some general purpose registers for storing data values manipulated by the execution unit 10 during execution of those instructions, and a conditions flag register 25 storing current values of certain condition flags, which are for example used when evaluating certain conditional instructions. Execution of particular instructions will also cause one or more of those flag values to be updated.

Additionally, an extension register bank 20 may in one embodiment be provided, which may for example be used when executing particular types of instructions, for example floating point instructions. For example, floating point operands may be stored within the extension register bank for reference by the execution unit 10.

Certain control and status registers may also be provided for access by the execution unit 10. By way of specific example, a floating point control register 30 may be provided for storing certain control information for reference by the execution unit when executing floating point instructions. An example of control information that may be stored within such a register is a rounding mode indication identifying the current rounding mode to be applied when performing floating point computations. In addition, a floating point status register 35 may be provided for storing certain status values used by the execution unit 10 when executing floating point instructions. Often these values will be sticky values, in that once they have been set they will remain set until positive steps are taken to clear those values.

Figure 1B:
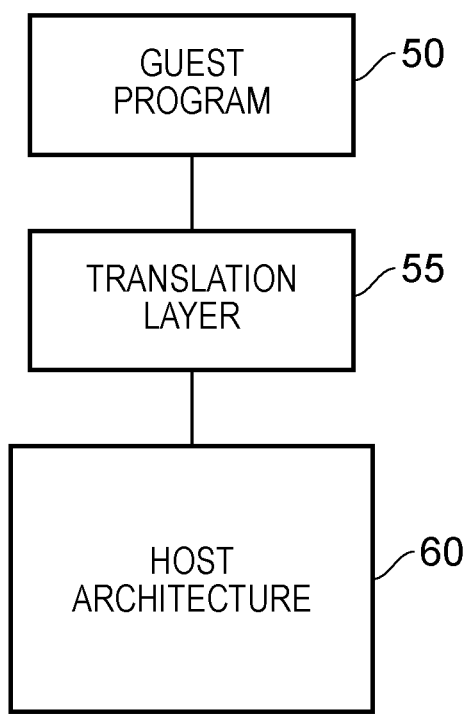

FIG. 1B schematically illustrates execution of a guest program on the host architecture of the host data processing system shown in FIG. 1A. The host data processing system 10 will be designed according to a host architecture 60, the host architecture describing the functionality, organisation and implementation of the host system. It will typically define the capabilities of the system and its programming model in an abstract way, and how the internal organisation of the system is designed and implemented to meet the specified capabilities. Amongst other things, the host architecture will typically define the host instruction set architecture, and hence the set of host instructions that can be executed on the host system.

A guest program 50 is provided that conforms to a guest architecture different from the host architecture. The guest architecture may be an architecture designed by the same company that designed the host architecture, or by a different company. It may also operate on the same data width size as the host architecture, or on a different data width size.

To enable the guest program 50 to be run on the host architecture 60 of the host system, a translation layer 55 is provided which incorporates the translation techniques of the embodiments described herein, in order to provide an efficient translation of the guest instructions into equivalent host instructions for executing on the host architecture. In particular, the translation layer makes use of multiple representation states, where each representation state provides a representation in the host architecture of at least one item of state from the guest architecture, and where guest instructions are translated in dependence on a current representation state. In some embodiments, functionality external to the translation layer may determine when changes in the current representation state should be made, and the translation layer will always translate the guest instructions in accordance with the current representation state. However, in some embodiments, the translation layer itself may be arranged to alter the current representation state during the process of translating one or more guest instructions, in order to seek to achieve a more optimal code translation.

Figure 2:
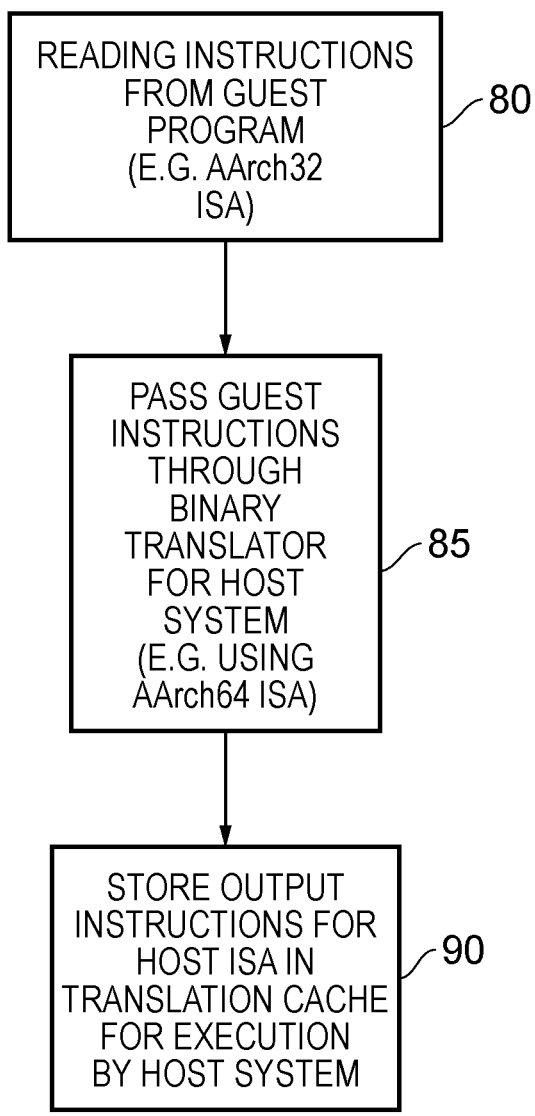
FIG. 2 is a flow diagram providing a general overview of the binary translation process in accordance with one embodiment.

FIG. 2 is a flow diagram providing a general overview of the code translation process. At step 80, instructions are read from the guest program. As mentioned earlier, the guest architecture and the host architecture can take a variety of forms. However, purely for the sake of illustration, it will be assumed in the following embodiments that the guest architecture is an ARM 32-bit architecture incorporating an AArch32 instruction set architecture (ISA) and the host architecture is an ARM 64-bit architecture incorporating an AArch64 ISA.

At step 85, guest instructions are passed through the binary translator provided within the translation layer 55 for the host system, in order to convert those guest instructions into an equivalent sequence of AArch64 instructions.

The resultant instructions for the 64-bit host ISA are then stored at step 90 in a translation cache, for subsequent execution by the host system.

The translation methodology of the embodiments described herein can be used in a variety of situations, including both static binary translation and dynamic binary translation. However, for the purposes of the following embodiments, it will be assumed that dynamic binary translation is performed. In accordance with dynamic binary translation, sections of code within the guest program are translated as and when required, and when it is determined that certain instructions have already been translated, with that translation existing within the translation cache, branch instructions are added to the translation cache to enable the already existing translation to be used at the appropriate point during code execution, rather than requiring retranslation of the relevant guest instruction(s).

It will hence be appreciated that, depending on the embodiment, the general process described in FIG. 2 can be repeated iteratively as required, for example during the ongoing process of dynamic binary translation.

FIG. 3 is a flow diagram illustrating in more detail the operation of the binary translator in accordance with one embodiment. At step 100, it is determined whether the binary translator has an instruction to translate. If the binary translator has an instruction to translate, the process proceeds to step 105 where the current representation state is determined. As will be described later with reference to the remaining figures, the representation states can represent a variety of different items of state within the guest architecture. As one specific example, the representation state may represent how the condition code flags of the guest architecture are represented within the hardware of the host architecture, as will be described in more detail later with reference to FIGS. 5A and 5B.

At step 110, it is then determined whether a translated instruction, or translated instruction sequence, already exists for the current representation state, for the guest instruction that requires translation. If so, then the process proceeds to step 115, where a branch instruction is output to the translation cache in order to identify the relevant host instruction(s) that are to implement the functionality of the guest instruction. Thereafter, the process returns to step 100 in order to determine whether there is another guest instruction to translate.

If at step 110 it is determined that there is no translation already existing in the translation cache for the current guest instruction, then the process proceeds to step 120 (optionally via a number of additional steps indicated in FIG. 3 with the label "A", that will be described later with reference to FIG. 6).

At step 120, the guest instruction is translated according to the current representation state in order to produce one or more host instructions to implement the function of the guest instruction, with those resultant host instructions being output to the translation cache. At step 125, it is then determined whether to change the representation state (for example to reflect any assumptions made when performing the translation at step 120), and if so the representation state is changed at step 130. Thereafter, the process returns to step 100.

Whilst in FIG. 3 it is assumed that the decision to change the representation state or not is taken after the translation performed at step 120, in alternative embodiments it may be determined appropriate to change the representation state prior to the translation.

FIG. 4A illustrates the arrangement of registers in the example guest and host architectures, namely the ARM AArch32 architecture forming an example of a guest architecture, and the ARM AArch64 architecture forming an example of the host architecture. In the AArch32 guest architecture, the general purpose registers 140 are represented by the label "R", and are 32-bit registers. The equivalent general purpose registers 150 in the AArch64 architecture are 64-bit registers and are referenced by the label "X". In addition, the least significant 32-bits of such X registers can be separately addressed, and referred to as "W" registers 155.

FIG. 4B illustrates some example translations between the AArch32 ISA and the AArch64 ISA. As can be seen, a simple ADD instruction in the AArch32 ISA can be translated to an equivalent ADD instruction in the AArch64 ISA, specifying equivalent W registers to the R registers of the guest architecture.

As mentioned earlier when discussing FIG. 1, certain instructions manipulate the condition code flags within the flags register 25. In one embodiment, the condition code flags take the form of N, Z, C and V flags, for a relevant instruction the N (negative) flag being set if the result is negative, the Z (zero) flag being set if the result is zero, the C (carry) flag being set if a carry occurs in the result, and the V (overflow) flag being set if the result overflows. In some situations, an AArch32 instruction and the equivalent AArch64 instruction may manipulate the flags in the same ways. This is shown by way of example with reference to the ADDS instruction, which in both the 32-bit architecture and the 64-bit architecture sets all of the flag values as appropriate having regards to the result. Accordingly, a simple translation can be performed. However, it is not always the case that there is direct equivalence between the two ISAs. For example, the ANDS instruction in ARMv7 of the AArch32 architecture only sets the N and Z flag as appropriate, leaving the C and V flags unchanged. However, the equivalent ANDS instruction in the AArch64 architecture sets the N and Z flags as appropriate, whilst clearing the C and V flags. Accordingly, it will be apparent that the AArch32 ANDS instruction cannot be directly translated into the AArch64 ANDS instruction, due to the different functionality with regards to the condition flags.

FIG. 4C illustrates a sequence of instructions in the AArch64 architecture that may be required in order to implement the functionality of the ANDS instruction from the AArch32 architecture, when not adopting the multiple representation state approach of the embodiment to be described later with reference to FIGS. 5A and 5B. This sequence of instructions uses bit field operations to effectively patch up the flag values, and is clearly rather expensive, due to the number of instructions that need to be executed to implement the functionality of the single guest instruction.

In more detail, the first move instruction MRS is used to move the contents of the flags register 160 in the host architecture into predetermined bits of one of the X registers, in this example X21 165. As can be seen, the four N, Z, C, V bits are stored in the most significant four bits of the W21 portion of the X21 register.

Thereafter, an ANDS instruction is executed on the equivalent W registers to the R registers specified by the AArch32 ANDS instruction, resulting in an update to the flags in the flags register 160. For ease of illustration, the original values that had been copied into register X21 are denoted with the subscript "p" to indicate that they are the previous values, and the updated values in the flags register 160 are denoted with the subscript "n" to indicate that they are the new values. As described earlier, the ANDS instruction in the 64-bit architecture will set the N and Z flags as appropriate, and will clear the C and V flags.

Thereafter, another move instruction is used to store the current contents of the flags register into a different X register, in this example X22 170.

Thereafter, a UBFX instruction is used to move the C and V bits in W21 to the least significant two bit positions, and then to set the rest of W21 to zero.

Thereafter, a BFI instruction is used to move those least significant two bits from the register W21 into bits 28 and 29 of W22, as a result of which bits 31 to 28 of the register X22 now contain the new values of the N and Z flags, and the previous values of the C and V flags. Thereafter, a move instruction can be used to move those values from the register X22 back into the flags register 160. As a result, it will be seen that the flags register then contains the values of the N, Z, C and V flags that would be present had the ANDS instruction of the 32-bit guest architecture have been executed.

As shown in FIG. 5A, in accordance with one embodiment of the present technique, two representation states are provided in the host architecture. The rep state 0 causes the AArch32 N, Z, C and V flags to be represented in the flags register 160 of the AArch64 architecture.

However, in addition an alternative representation state, rep state 1, is provided, in which the N and Z flags from the AArch32 architecture are represented in the flags register 160 of the AArch64 architecture, but the C and V flags are represented in predetermined bits of a particular chosen general purpose register. In the example illustrated in FIG. 5A, it is assumed that the general purpose register X20 is chosen, and in particular the C and V flags are represented in bits 28 and 29 of the W20 register within the X20 register 180.

FIG. 5B is an equivalent figure to FIG. 4B, and as can be seen both the ADD and the ADDS instructions are translated as before. However, whilst the ADD instruction is translated in exactly the same way whatever the representation state currently is, when the ADDS instruction is executed it is ensured that the current representation state at the end of the process is representation state 0. Accordingly, if at the time the ADDS instruction is executed it is currently in the rep state 1, the ADDS instruction executed in the host architecture will update all of the flags in the flags register 160, and accordingly it is appropriate to change to rep state 0.

With regard to the ANDS instruction, this is translated differently dependent on the current representation state. If the current representation state is rep state 1, then the ANDS instruction can merely be translated into the equivalent ANDS instruction in the 64-bit architecture, since although that ANDS instruction of the 64-bit architecture will clear the C and V flags in the flags register 160, the current representation state being rep state 1 takes its C and V values from bits 28 and 29 of the X20 register, and accordingly still identifies the appropriate values of the N, Z, C and V flags as would be the case had the ANDS instruction of the 32-bit architecture have been executed. When adopting such a translation, the process remains in the rep state 1.

If at the time of translating the ANDS instruction, the current rep state is rep state 0, then the ANDS instruction is translated as shown into a move instruction and an ANDS instruction in the 64-bit architecture. In particular, the current contents of the flags register 160 are stored in the register X20, and thereafter the ANDS instruction of the 64-bit architecture is executed on the equivalent W registers to the R registers specified by the 32-bit ANDS instruction. Following this translation, the state moves to rep state 1. In accordance with rep state 1 as shown in FIG. 5A, it will then be appreciated that the host architecture will have a view of the N, Z, C and V flags that provides the correct values of those flags, i.e. the values that would be present had the original 32-bit ANDS instruction been executed.

Accordingly, it can be seen that by providing the two different rep states, a significant reduction in the complexity of the required code translation can be achieved for certain guest instructions.

It may be the case that, due to loops within code, branches, etc, the same guest instruction may be encountered in more than one rep state, and may therefore need to be translated more than once. However, it has been found that this additional step is often likely to be significantly outweighed by the benefit achievable from the resulting code density improvements in the translations produced.

In addition, if desired, the binary translator may decide to switch rep states in order to take advantage of an existing translation. This may for example be beneficial in embodiments that include a significant number of different rep states. FIG. 6 is a flow diagram illustrating some additional steps that can be incorporated within the process of FIG. 3 in order to provide such functionality.

As shown in FIG. 6, at step 200 the process proceeds from step 110 of FIG. 3, and hence at this point it has been determined that a translation does not already exist for the guest instruction under consideration having regards to the current rep state. At step 205 it is determined whether a translation exists for that guest instruction for another rep state. If not, then the process merely proceeds to step 120 of FIG. 3, as shown by step 210 of FIG. 6.

However, if such a translation is determined to already exist, then at step 215 predetermined criteria are applied to determine whether to switch the representation state from the current representation state to the representation state for which a translation already exists. It will be appreciated that the criteria to be applied will very much depend on embodiment, but in one embodiment application of the predetermined criteria will seek to assess whether any cost associated with switching the representation state is likely to be outweighed by enabling utilisation of the existing translation. This may be determined merely by looking at the current guest instruction under consideration, or could alternatively take into account a number of the guest instructions that are awaiting translation. At step 220, it is determined whether application of the predetermined criteria has identified that the rep state should be switched, and if not the process proceeds directly to step 120 of FIG. 3, as shown by step 210 of FIG. 6.

However, if it is determined at step 220 that the rep state should be switched, then at step 225 the binary translator activates an appropriate mechanism to switch the rep state. In one embodiment this is achieved by outputting one or more instructions to switch the rep state from the current rep state to the relevant rep state for which a translation is already provided (in an alternative embodiment an instruction may not be needed for this purpose), and also outputting a branch instruction to identify the relevant host instruction (s) that have already been produced as a translation for the guest instruction for the rep state that is to be switched to. Both the switch rep state instruction(s) (if used) and the branch instruction will typically be added to the translation cache. Thereafter, the process returns to step 100 of FIG. 3, as shown by step 230 of FIG. 6.

The form of the instruction(s) required to switch rep state will depend on the rep states in question (and indeed in some embodiments an instruction may not be required). However, considering the earlier example of FIG. 5A, and in particular the two rep states used to represent the N, Z, C and V flags, a transition from rep state 0 to rep state 1 can be achieved, for example, merely by emitting a single MRS move instruction to move the contents of the flag register into one of the working registers.

As one concrete example of an implementation of steps 205 and 215, it may in one embodiment be arranged that the translation process will always move into rep state 1 before taking an indirect (register) branch. Accordingly, when the guest instruction is an indirect branch instruction, and it is encountered in rep state 0, it will be determined at step 110 of FIG. 3 that there is no translation for that instruction for rep state 0, but at step 205 it may be determined that there is a translation that exists for that instruction for rep state 1. The predetermined criteria will in effect determine that it is always appropriate to switch to rep state 1 given that the instruction in question is an indirect branch instruction, and accordingly a move instruction will be issued to move into rep state 1, whereafter a translation of the indirect branch instruction in rep state 1 will be re-used.

FIG. 7 schematically illustrates another example of rep states that can be used in one embodiment. In particular, in the AArch32 architecture, load and store instructions operate differently dependent on the state of the processor, and in particular dependent on the current endianness state of the processor. However, in the AArch64 architecture, it may typically be the case that the endianness is fixed, for example as little endian.

In such an embodiment, two different rep states Y and Z can be established, rep state Y indicating that the guest architecture is currently little endian, and rep state Z indicating that the guest architecture is currently big endian. As shown in the upper figure of FIG. 7, when in rep state Y, and assuming that the AArch64 architecture is little endian, then a simple translation of a load or store instruction can occur. In particular, a load instruction is shown that moves four bytes of data from a memory location 250 into a W register within an X register 260 of the host architecture. No other steps are required given that both the guest and host architectures are little endian.

However, as shown by the lower figure in FIG. 7, if the current rep state is rep state Z, then in addition to using a load instruction to load the contents of the memory location 250 into the W register of the X register 260, various further instructions will also need to be performed in the AArch64 architecture in order to achieve the necessary byte swap operations to place the data in little endian format, given that it is known that the guest processor is operating in big endian format.

In this embodiment, the translation layer does not itself bring about any change in the rep state, but merely adapts the translation having regard to the current rep state. Instead, the rep state will be updated when instructions are encountered within the guest program that change the endianness of the guest architecture.

As mentioned in FIG. 1A, an FP control register 30 may be provided for reference by the execution unit 10 when performing floating point operations. In the AArch32 architecture, some floating point instructions (for example scalar floating point instructions) use the floating point control register (FPCR) values directly, whilst other floating point instructions (for example vector floating point instructions) ignore the FPCR values in the FPCR and instead use some standard replacement values. However, there is no equivalent in the AArch64 architecture, and instead all floating point instructions use the FPCR values in the FPCR 30.

Accordingly, as another example of multiple representation states that can be provided, a representation state M may be used to indicate that the AArch64 FPCR contains the AArch32 FPCR values (with optionally a copy of those values being kept in a separate register).

In contrast, another rep state N will indicate that the AArch64 FPCR 30 contains the standard set of replacement values used for example by vector floating point instructions, whilst the guest FPCR values are then kept in a separate register. If we consider the AArch32 vector floating point ADD instruction VADD.F32 Dd, Dn, Dm, then if the current rep state is rep state M, a significant number of instructions are needed to setup the standard values in the FPCR register and restore the FPCR contents afterwards. In particular, the following sequence of instructions may for example be required.

Let di=d/2, ni=n/2, mi=m/2,
dj=d % 2, nj=n % 2, mj=m % 2.

The translated sequence of instructions sets up the standard FPCR values for the vector floating-point operation, and restores the FPCR afterwards.

| MRS | Xtmp1,FPCR |
| MOV | Wtmp2,#0x3000000 |
| MSR | FPCR,Xtmp2 |
| ISB | |
| MOV | Dtmp1,Vni.D[nj] ; redundant if nj = 0 |
| MOV | Dtmp2,Vmi.D[mj] ; redundant if mj = 0 or m = n |
| FADD | Vtmp1.2S,Vtmp1.2S,Vtmp2.2S |
| MOV | Vdi.D[dj],Vtmp1.D[0] |
| MSR | FPCR,Xtmp1 |
| ISB | |

The first four and the last two instructions in the above sequence are used for handling the FPCR contents. The move instructions on either side of the floating point add instruction FADD (which is the actual operation needing to be performed) are for handling register aliasing issues. If the current rep state is rep state M, then all of the above sequence of instructions could in one embodiment be used as the translation, with the rep state remaining in rep state M. However, it will be appreciated that this represents a significant complexity that will affect performance, and significantly reduce code density.

Some simplification in the instructions could be achieved if it was decided to make judicious use of switching between the rep states M and N during the translation, for example this potentially enabling removal of the first four instructions and the last two instructions used to handle the FPCR contents. Further, if additional rep states are used, such as the U and V states discussed later with reference to FIG. 9 relating to mapping of vector registers, it may be possible to remove one or more of the MOV instructions.

Alternatively, if the current rep state is rep state N at the time the VADD instruction is encountered, it may be possible to translate the VADD instruction into a single equivalent floating point ADD instruction in the AArch64 architecture, for example:

fadd v1.2s,v2.2s,v3.2s

Accordingly, significant code density improvements could be achieved.

As also mentioned in FIG. 1A, an FP status register 35 may be provided for reference by the execution unit during the execution of floating point instructions, this FPSR storing various sticky bit values.

Some AArch32 floating point instructions can require complex translation into equivalent AArch64 instructions to achieve the same functionality, but if it is known that one or more specific sticky bits are already set, the translation can be significantly simplified.

Accordingly, as another example of multiple representation states, a representation state P can be set to identify that it is not known whether the relevant sticky bits have been set in the AArch32 architecture (or if it is known that the sticky bits have not been set). In such a rep state, it will be necessary for the full complex translation to be performed. However, another rep state R can be provided, to identify situations where it is known that the relevant sticky bits have already been set in the AArch32 architecture. As a particular example, the translation can be significantly simplified if it is known that the invalid (IOC) sticky bit and the inexact (IXC) sticky bit have already been set.

During runtime, the AArch32 state would be monitored in order to detect situations when the invalid and inexact sticky bits have been set, and accordingly the rep state can transition to rep state R. Similarly, if any of those sticky bits are subsequently cleared, it will be necessary to switch back to rep state P. For the sake of an explicit example, the following AArch32 instruction will be considered:

VCVT.U16.F32 Sd,Sd,#fbits

This instruction converts from a 32-bit floating point value to a 16-bit fixed-point value, and rounds towards zero. Because the operation rounds towards zero, the same result is achieved if rounding is performed twice, so it is possible to achieve the correct result with the following simple translation:

| MOV | Stmp1,Vdi.S[dj] | ; redundant if dj = 0 |
| FCVTZU | Stmp1,Stmp1,#x | ; x = fbits + 16 |
| USHR | Dtmp1,Dtmp1,#16 | |
| MOV | Vdi.S[dj],Vtmp1.S[0] | |

The FCVTZU instruction converts from 32-bit floating point to 32-bit fixed-point, and the USHR instruction then discards the bottom sixteen bits, so as to produce a 16-bit fixed-point number.

However, achieving the right exceptions, that is setting the IOC and IXC sticky bits correctly, involves a significant amount of complexity. In particular, a translation in which saturation is handled with core-register logic may take the following thirteen instructions:

| MRS | Xtmp1,FPSR | |
| MSR | FPSR,XZR | |
| MOV | Stmp1,Vdi.S[dj] | ; redundant if dj = 0 |
| FCVTZU | Stmp1,Stmp1,#fbits | ; fbits may be zero |
| MRS | Xtmp2,FPSR | |
| UMOV | Wtmp3,Vtmp1.S[0] | |
| LSR | Wtmp4,Wtmp3,#16 | |
| CBZ | Wtmp4,{PC}+12 | |
| MOV | Wtmp3,Wtmp3,#0xffff | |
| MOV | Wtmp2,#1; | IOC bit |
| MOV | Vdi.S[dj],Wtmp3 | |
| ORR | Wtmp1,Wtmp1,Wtmp2 | |
| MSR | FPSR,Xtmp1 | |

An alternative translation, in which the rounding is handled with core register logic, is slightly longer, as follows:

```
MRS     Xtmp1,FPSR
MSR     FPSR,XZR
MOV     Stmp1,Vdi.S[dj]         ; redundant if dj = 0
FCVTZU  Stmp1,Stmp1,#x          ; x = fbits + 16
MRS     Xtmp2,FPSR
UMOV    Wtmp3,Vtmp1.S[0]
USHR    Dtmp1,Dtmp1,#16
MOV     Vdi.S[dj],Vtmp1.S[0]
TBNZ    Wtmp2,#0,{PC}+16        ; bypass if IOC
AND     Wtmp3,Wtmp2,#0xffff
CBZ     Wtmp3,{PC}+8            ; bypass if low bits zero
ORR     Wtmp1,Wtmp1,#26         ; set IXC
ORR     Wtmp1,Wtmp1,Wtmp2
MSR     FPSR,Xtmp1
```

Considering the earlier mentioned rep states P and R, if the current rep state is rep state P, then one of these relatively long code sequences will be required as a translation for the earlier mentioned VCVT instruction. However, if the current rep state is rep state R, and hence it is known that the IOC and IXC sticky bits have already been set, then it is possible to use the simple translation, namely the four instructions discussed earlier, hence achieving significantly improved code density.

As another example embodiment of representation states, some of the guest instructions may manipulate an item of state data specific to the guest architecture. One particular example is where the guest program counter value is manipulated by a guest instruction. Typically, the guest PC value will not be available to the host architecture, and it will be understood that the host PC value will often not equate with the guest PC value. However, as another example of multiple representation states, the concept of rep states could be used to identify one or more registers in the AArch64 architecture that store values that have been derived from the guest PC value, and to then use that information to ease the translation of guest instructions that manipulate the guest PC value, or a value derived therefrom. In particular, a first representation state E can be used to denote a situation where no register tracking takes place, and accordingly each such guest instruction has to be translated in the standard manner. However, an additional rep state F can be used to denote a register tracking mode, where the contents of at least one identified AArch64 register contains a value derived from the guest PC value, which can be used to reduce the translation. For example, if we consider the following two add instructions appearing at the guest PC values shown:

```
0x40001000      add     R1,pc,#64 ; sets R1 to 0x40001048
...
0x40001010      add     R2,pc,#56 ; sets R2 to 0x40001050
```

If rep state E is maintained, then each of these two ADD instructions can be translated into a move and a move keep (MOVK) instruction as follows:

|                    | MOV  | W1,#0x1048         |
|                    | MOVK | W1,#0x4000,lsl #16 |
| STAY IN REP STATE E | ...  |                    |
|                    | MOV  | W2,#0x1050         |
|                    | MOVK | W2,#0x4000,lsl #16 |

In particular, the first ADD instruction adds the program counter value, namely 0X40001000 to a value of 8 (representing an increment of the program counter value) and to the value 64 specified by the instruction, and puts the result in register R1. Hence, the register R1 gets set to the value 0X40001048. Two move instructions are required to achieve this functionality in AArch64 instructions, and similarly an additional two move instructions are required to achieve the functionality of the second add instruction.

However, if after translating the first ADD instruction in an identical way, the rep state is then changed to rep state F, which tracks the content of register W1, then the two ADD instructions can be translated as follows:

|                       | MOV  | W1,#0x1048         |
|                       | MOVK | W1,#0x4000,lsl #16 |
| CHANGE TO REP STATE F | ...  |                    |
|                       | ADD  | W2,W1,#8           |

In particular, the value stored in W1 can be reused in order to reduce the complexity of the translation of the second ADD instruction.

Accordingly, by such an approach, keeping track of which known values are in which registers in the host architecture can be achieved by making that information part of a representation state, in order to simplify the translation required.

As mentioned earlier, the extension register bank 20 can be used to provide various registers used when processing floating point operations. In both the AArch32 architecture and the AArch64 architecture, there is the concept of different size registers within the extension register bank. In particular, there are 128-bit Q registers, which incorporate separately addressable 64-bit D registers and 32-bit S registers. As shown in FIG. 8, in the AArch32 architecture, a set of sixteen 128-bit Q registers 300 may be provided, which can be considered to contain 32 64-bit D registers 305. In addition, the first eight Q registers can be considered to contain 32 32-bit S registers 310.

In the AArch64 architecture, the mapping between the Q, D and S registers is somewhat different, as shown in the lower figure in FIG. 8. In particular, there are 32 128-bit Q registers 320, and each Q register contains one corresponding D register giving the set of 32 D registers 325. Similarly, each D register contains one associated S register, giving the set of 32 S registers 330 shown in FIG. 8.

As another example of how the representation states could be used, it is possible to provide a different mapping of the vector registers between the guest registers of the guest architecture and corresponding host registers of the host architecture. This process is illustrated in FIG. 9. In particular, as discussed earlier with reference to FIG. 8, the AArch64 registers in the extension register bank 20 contain a series of 128-bit Q registers 350. In accordance with a first representation state U, the D and S registers 355, 360 of the guest architecture are mapped to the host architecture in exactly the same way as they are represented in the guest architecture, as will be apparent from a comparison of the series of D registers 355 and S registers 360 of FIG. 9 with the earlier described FIG. 8. However, in accordance with an alternative representation state V, the guest registers D 365 are mapped into the form normally associated with the AArch64 architecture. The S registers 370 are then mapped in a bespoke manner not directly corresponding to either the AArch32 representation or the AArch64 representation.

As shown in FIG. 9, if we consider a floating point vector ADD instruction, if the current rep state is rep state V, this can be readily mapped to the equivalent vector ADD instruction of the 64-bit architecture operating on the relevant D registers, given that the D registers of the guest architecture have been mapped to match the normal locations of the D registers in the AArch64 architecture.

However, if the current state is rep state U, then the sequence of four instructions shown in FIG. 9 are required to implement the 32-bit vector ADD instruction. In particular, the first extract instruction extracts the uppermost 64-bit lane of Q1 (which represents the source register D3 in accordance with the mapping 355) and stores the result in register D19. Similarly, the second extract instruction extracts the upper lane (i.e. the upper half of the contents) of register Q2 (which represents the source register D5 in accordance with the mapping 355), and stores the result in register D20. Thereafter, the contents of D19 and D20 are added together and stored back into D19. Thereafter, the insert instruction is used to insert the contents of D19 into the upper half of the register Q0 (which represents the destination register D1 in accordance with the mapping 355).

Accordingly, it can be seen that the efficiency of the translation will depend on the mapping employed. If it is desired to change the mapping, so as for example to improve the efficiency of subsequent translations, then a decision may need to be made as to whether that change is worthwhile, given that any change in the rep state may potentially involve significant overhead, due for example to the need to move the contents of various registers so that those register contents are consistent with the new rep state. Typically it may be necessary to look ahead through the code when evaluating whether it is worthwhile to change the rep state in this embodiment.

The above described code translation techniques can be performed by hardware, firmware, software, or a combination of such elements. In one embodiment, suitable software can be defined for performing the required code translation operations, and may be run on any suitable general purpose computer, such as that illustrated with reference to FIG. 10.

FIG. 10 schematically illustrates a general purpose computer 400 of the type that may be used to implement the above described techniques, and in particular the code translation techniques described herein. The general purpose computer 400 includes a central processing unit 402, a random access memory 404, a read-only memory 406, a network interface card 408, a hard disk drive 410, a display driver 412 and monitor 414, and a user input/output circuit 416 with a keyboard 418 and mouse 420 all connected via a common bus 422. In operation the central processing unit 402 will execute computer program instructions that may be stored in one or more of the random access memory 404, the read-only memory 406 and the hard disk drive 410, or dynamically downloaded via the network interface card 408. The results of the processing performed may be displayed to a user via the display driver 412 and the monitor 414. User inputs for controlling the operation of the general purpose computer 400 may be received via the user input/output circuit 416 from the keyboard 418 or the mouse 420. It will be appreciated that the computer program could be written in a variety of different computer languages. The computer program may be stored and distributed on a recording medium or dynamically downloaded to the general purpose computer 400. When operating under control of an appropriate computer program, the general purpose computer 400 can perform the above described code translation techniques and can be considered to form an apparatus for performing the above described techniques. The architecture of the general purpose computer could vary considerably, and FIG. 10 is only one example.

From the above described embodiments, it can be seen that the described binary translation techniques make use of multiple representation states for a more efficient translation of instructions of a guest architecture into equivalent instructions of a host architecture, thereby enabling a data processing system running such guest instructions on a host architecture to operate with improved performance, reduced energy consumption, etc. In addition, by allowing a more efficient execution of guest binaries on a host system, this will allow people to move more quickly and confidently to using the host architecture, which in turn allows faster development and verification of more efficient hardware.

Various different embodiments of different representation states have been described with reference to the various figures. Whilst each of these different embodiments may be implemented independently, it will also be appreciated that in other embodiments multiple of these different representation states may co-exist within the same system so as to enable multiple items of state to be tracked and utilised in order to improve binary translation efficiency.

The described techniques can be used in association with a wide variety of different guest architectures and host architectures, whether developed by the same company or not, and whether operating on the same data widths or not. The above example where the guest architecture is an ARM AArch32 architecture, and the host architecture is an ARM AArch64 architecture is provided merely for the sake of illustration.

In the present application, the words "configured to . . . " are used to mean that an element of an apparatus has a configuration able to carry out the defined operation. In this context, a "configuration" means an arrangement or manner of interconnection of hardware or software. For example, the apparatus may have dedicated hardware which provides the defined operation, or a processor or other processing device may be programmed to perform the function. "Configured to" does not imply that the apparatus element needs to be changed in any way in order to provide the defined operation.

Although illustrative embodiments of the invention have been described in detail herein with reference to the accompanying drawings, it is to be understood that the invention is not limited to those precise embodiments, and that various changes, additions and modifications can be effected therein by one skilled in the art without departing from the scope and spirit of the invention as defined by the appended claims. For example, various combinations of the features of the dependent claims could be made with the features of the independent claims without departing from the scope of the present invention.

The invention claimed is:

1. A computer-implemented method of translating a guest instruction of a guest architecture into at least one host instruction of a host architecture, comprising:

providing, within a host system, multiple representation states, wherein each representation state provides a respectively different register arrangement for representing, within the hardware of the host architecture, at least one portion of state information from the guest architecture, and wherein the state information represents a status of the guest architecture;

determining, within the host system, a current representation state, the current representation state being one of the multiple representation states; and translating, using a code translation element within a translation layer, the guest instruction into a first at least one host instruction of the host architecture or a second at least one host instruction of the host architecture depending on the current representation state, wherein the first at least one host instruction is different from the second at least one host instruction, and wherein the code translation element (1) determines whether to change the current representation state to be another one of the multiple representation states during translation of the guest instruction depending on whether the respectively different register arrangement of the current representation state corresponds to a register arrangement that provides register values that would be present had the guest instruction been executed; and (2) when it is determined to change the current representation state to be another one of the multiple representation states, causes changing of the current representation state to the another one of the multiple representation states and translate the guest instruction to the first at least one host instruction, or, when it is not determined to change the current representation state to be another one of the multiple representation states, translate the guest instruction to the second at least one host instruction without changing the current representation state.

2. A computer-implemented method as claimed in claim 1, further comprising:

selecting a translation mechanism from a first translation mechanism and a second translation mechanism dependent on which of the first and second translation mechanisms will produce a more efficient translation, the first translation mechanism translating the guest instruction whilst maintaining the current representation state and the second translation mechanism translating the guest instruction whilst changing the current representation state;

said translation of the guest instruction employing the selected translation mechanism; and wherein the selected translation mechanism is the one of the first and second translation mechanism that produces the least number of host instructions to implement the function of the guest instruction.

3. A computer-implemented method as claimed in claim 1, further comprising storing in a translation-storage the generated at least one host instruction for subsequent execution.

4. A computer-implemented method as claimed in claim 3, further comprising:

determining when a translation of the guest instruction for the current representation state already exists in the translation-storage, and upon such determination outputting a reference to the existing translation instead of translating the guest instruction.

5. A computer-implemented method as claimed in claim 3, further comprising:

determining when a translation of the guest instruction already exists in the translation-storage for a different representation state that is not the current representation state;

upon such determination, applying predetermined criteria to determine whether to change the current representation state to said different representation state;

when it is determined to change the current representation state, activating a predetermined mechanism to implement the change of the current representation state to said different representation state, and outputting for storage in the translation-storage a reference to the existing translation instead of translating the guest instruction.

6. A computer-implemented method as claimed in claim 4, wherein said outputting a reference comprises adding a branch instruction to the translation-storage.

7. A computer-implemented method as claimed in claim 1, wherein:

the multiple representation states comprise at least two representation states that provide different representations in the host architecture of said at least one portion of state information from the guest architecture.

8. A computer-implemented method as claimed in claim 7, wherein said at least one portion of state information comprises a plurality of condition flag values.

9. A computer-implemented method as claimed in claim 8, wherein in a first representation state the plurality of condition code flags are stored in a condition flags register provided in the host architecture, and in a second representation state a first subset of the plurality of condition code flags are stored in the condition flags register provided in the host architecture and a second subset of the condition code flags are stored in a further register.

10. A computer-implemented method as claimed in claim 9, wherein when the guest instruction is a predetermined guest instruction, a code translation element used to translate the guest instruction changes the current representation state from said first representation state to said second representation state during translation of the guest instruction.

11. A computer-implemented method as claimed in claim 1, wherein said multiple representation states comprise a first endian representation state set when the guest architecture is using a first endian data format, and a second endian representation state set when the guest architecture is using a second endian data format, the translation of the guest instruction being dependent on which of the first and second endian representation states is the current representation state.

12. A computer-implemented method as claimed in claim 1, wherein said multiple representation states comprise at least a first control storage representation state indicating that first state information from the guest architecture is represented within a predetermined control storage of the host architecture, and a second control storage representation state indicating that second state information from the guest architecture is represented within said predetermined control storage of the host architecture.

13. A computer-implemented method as claimed in claim 12, wherein the first state data is state data associated with a first type of guest instruction, and the second state data is state data associated with a second type of guest instruction.

14. A computer-implemented method as claimed in claim 13, wherein the first state data is state data associated with an equivalent control storage of the guest architecture to the predetermined control storage of the host architecture, and the second state data is a set of replacement state values used by the second type of guest instruction instead of the state data associated with the equivalent control storage of the guest architecture.

15. A computer-implemented method as claimed in claim 1, wherein said multiple representation states comprise a first status field representation state indicating that one or more status values have been set by the guest architecture, and a second status field representation state indicating that setting of said one or more status values by the guest architecture is one of not known and not set, the translation of the guest instruction being dependent on which of the first and second status field representation states is the current representation state.

16. A computer-implemented method as claimed in claim 15, wherein said one or more status values comprises at least one of an invalid sticky value and an inexact sticky value.

17. A computer-implemented method as claimed in claim 1, wherein said multiple representation states comprise a first register tracking representation state indicating that no register tracking is being performed, and a second register tracking representation state identifying a register location in the host architecture storing a data value derived from the at least one portion of state information from the guest architecture.

18. A computer-implemented method as claimed in claim 17, wherein the at least one portion of state information from the guest architecture is a program counter value from the guest architecture.

19. A computer-implemented method as claimed in claim 7, wherein said at least two representation states comprises a first register mapping representation state providing a first mapping between registers of the guest architecture and registers of the host architecture, and a second register mapping representation state providing a second mapping between registers of the guest architecture and registers of the host architecture.

20. A computer-implemented method as claimed in claim 19, wherein a code translation element used to translate the guest instruction applies predetermined criteria in order to determine whether to change the current representation state prior to translation of the guest instruction.

21. A computer-implemented method as claimed in claim 1, wherein the method performs dynamic binary translation of a sequence of guest instructions.

22. A computer-implemented method as claimed in claim 1, wherein the host architecture uses a different data width from a data width used by the guest architecture.

23. A non-transitory computer program product comprising a computer program which, when executed on a computer, performs the computer-implemented method of translating a guest instruction of a guest architecture into at least one host instruction of a host architecture as claimed in claim 1.

24. A computer-implemented method as claimed in claim 1, wherein the at least one portion of state information from the guest architecture is state information that is used by the guest instruction.

25. A system for translating a guest instruction of a guest architecture into at least one host instruction of a host architecture, comprising:
storage to identify a current representation state from multiple representation states, each representation state providing respectively different register arrangement for representing, within the hardware of in the host architecture, at least one portion of state information from the guest architecture, wherein the state information represents a status of the guest architecture; and
translation circuitry to translate, using a code translation element, the guest instruction into a first at least one host instruction of the host architecture or a second at least one host instruction of the host architecture depending on the current representation state, wherein the first at least one host instruction is different from the second at least one host instruction, and
wherein the code translation element (1) determines whether to change the current representation state to be another one of the multiple representation states during translation of the guest instruction depending on whether the respectively different register arrangement of the current representation state corresponds to a register arrangement that provides register values that would be present had the guest instruction been executed; and (2) when it is determined to change the current representation state to be another one of the multiple representation states, causes changing of the current representation state to the another one of the multiple representation states and translate the guest instruction to the first at least one host instruction, or, when it is not determined to change the current representation state to be another one of the multiple representation states, translate the guest instruction to the second at least one host instruction without changing the current representation state.

26. A data processing apparatus for executing a guest program comprising guest instructions of a guest architecture, the data processing apparatus having a host architecture and comprising a system as claimed in claim 25 for translating guest instructions of the guest architecture into host instructions of the host architecture.

27. A system for translating a guest instruction of a guest architecture into at least one host instruction of a host architecture, comprising:
means for identifying a current representation state from multiple representation states, each representation state providing a respectively different register arrangement for representing, within the hardware of the host architecture, at least one portion of state information from the guest architecture, wherein the state information represents a status of the guest architecture; and
means for translating, using a code translation means, the guest instruction into said at least one host instruction of the host architecture or a second at least one host instruction of the host architecture depending on the current representation state wherein the first at least one host instruction is different from the second at least one host instruction, and,
wherein the code translation means (1) determines whether to change the current representation state to be another one of the multiple representation states during translation of the guest instruction depending on whether the respectively different register arrangement of the current representation state corresponds to a register arrangement that provides register values that would be present had the guest instruction been executed; and (2) when it is determined to change the current representation state to be another one of the multiple representation states, causes changing the current representation state to the another one of the multiple representation states and translate the guest instruction to the first at least one host instruction, or, when it is not determined to change the current representation state to be another one of the multiple representation states, translate the guest instruction to the second at least one host instruction without changing the current representation state.

* * * * *